(12) United States Patent
Walsh

(10) Patent No.: US 8,107,486 B1
(45) Date of Patent: Jan. 31, 2012

(54) FLEXIBLE QUEUE CONTROLLER RESERVE LIST

(75) Inventor: Hugh Walsh, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 778 days.

(21) Appl. No.: 11/868,950

(22) Filed: Oct. 8, 2007

Related U.S. Application Data

(60) Provisional application No. 60/829,069, filed on Oct. 11, 2006.

(51) Int. Cl.
*H04L 12/28* (2006.01)

(52) U.S. Cl. .......... 370/412; 370/389; 370/351; 710/52; 710/56

(58) Field of Classification Search .................. 370/351, 370/389, 412
See application file for complete search history.

(56) References Cited

U.S. PATENT DOCUMENTS

| | | | |
|---|---|---|---|
| 7,007,099 B1* | 2/2006 | Donati et al. | 709/237 |
| 7,657,706 B2* | 2/2010 | Iyer et al. | 711/117 |
| 2003/0095560 A1* | 5/2003 | Arita et al. | 370/431 |
| 2003/0174572 A1* | 9/2003 | Moir et al. | 365/230.03 |
| 2004/0049613 A1* | 3/2004 | Kim et al. | 710/52 |

OTHER PUBLICATIONS

Samanta, Classic Data Structures, Jan. 2003.*

* cited by examiner

*Primary Examiner* — Hassan Phillips
*Assistant Examiner* — Gautam Sharma

(57) ABSTRACT

A device and method of allocating pointers in a network switch includes allocating the first predetermined number of free pointers from a free list to a first in first out memory, allocating the second predetermined number of pointers to a linked list after the first predetermined number of pointers for the first in first out memory has been allocated, receiving a frame in the network switch, forwarding at least one pointer from the first in first out memory to an ingress module to buffer the frame, and forwarding pointers from the linked list to the first in first out memory to an ingress module to buffer the frame.

30 Claims, 12 Drawing Sheets

FLEXIBLE QUEUE CONTROLLER RESERVE LIST

CROSS-REFERENCE TO RELATED APPLICATIONS

This application claims priority under 35 U.S.C. §119(e) to provisional U.S. Patent Application No. 60/829,069, filed on Oct. 11, 2006, the disclosure of which is expressly incorporated by reference herein in its entirety.

BACKGROUND

1. Field of the Invention

The invention relates generally to data communications with a network switch, and, more particularly, to implementing a reserve list within a network switch.

2. Related Art

The rapidly increasing popularity of networks such as the Internet has spurred the demand for network services. In order to meet the demand for the increased network services, it has been found that increasing the size of frames typically increases the through-put of a network and therefore meets the increased demand.

The prior art networks typically used a 1518 byte frame size that was designed to protect against the high error rate of physical-layer Ethernet components. However, computer processing power has increased by an order of magnitude. Moreover, the use of switched Ethernet over various media has significantly reduced errors. With these reduced errors, larger frame sizes may now be used with greater success.

Increasing the frame size typically reduces server overhead and increases through-put and has become an attractive option. However, typical switches have experienced a number of problems handling the larger frame size. In particular, as described in further detail below, the first in first out type pointer buffers are required to have greater memory capacity, which increases at least the cost thereof. The typical alternative technology, i.e., linked list type devices have their own problems, such as difficulties processing at an increased speed.

FIG. 1 shows a conventional network 100 in which a network switch 102 connects devices 104A-104N and 112A-112N. Each of devices 104A-N, 112A-N can be any network device, such as a computer, a printer, another network switch, or the like. Switch 102 transfers data between the devices 104A-N, 112A-N over channels 106A-N and 114A-N. Channels 106A-N and 112A-N typically include fiber optic links, wireline links, or wireless links.

In the typical network switch 102, a queue controller manages and assigns pointers to a buffer 108. The buffer 108 typically stores frame data received from any one of the devices 104A-N and 112A-N. A typical frame has its data fragmented into many discontinuous portions in the buffer 108. The queue controller typically organizes these portions with lists of pointers and forwards these lists from ingress of frames to egress of frames through ports of ingress modules and egress modules.

Accordingly, as frames are received in the switch 102, they are stored in the buffer 108. The location of the frames in the buffer 108 is based on the pointers as is well known in the art. The pointers are obtained from a reserve pointer storage 110. One conventional approach to storing a pointer in the reserve pointer storage is the use of a first in first out (also referred to herein as "FIFO") type reserve pointer storage 110 as described in further detail below.

FIG. 1 shows the switch 102 having a FIFO reserve pointer storage 110. One advantage of this typical arrangement is that the control logic for fetching free pointers from the reserve list and providing reserve pointers to the ingress module is very simple. Another advantage is that prefetching of enough pointers to the FIFO memory to meet certain speed constraints for the worst case (typically consecutive frames of size 1 kilobyte greater than the buffer size) can be accomplished. However, the disadvantage of the reserve list FIFO pointer storage is that it consumes a great deal of area when the fragmentation is high. For example, a large frame size implementation would need 20 deep FIFO memories per port, and utilizing fragmented 128 byte buffers would require 80 deep FIFO memories per port. This results in increased cost and complexity for the memory and the switch.

FIG. 2 shows a conventional switch 102 utilizing the alternative linked list reserve pointer storage 110. In this implementation, reserve pointers are typically stored in a linked list. The reserve list is stored in a module that may typically maintain three registers that describe the lists. The description typically includes head, tail, and size. The links between pointers are typically stored in an embedded memory in the switch. The advantage of the linked list approach is that it is more area efficient as fragmentation of the memory increases. Regardless of how many pointers are needed in a frame, the reserve list only requires the three registers (i.e., head, tail, and size). However, the disadvantage of the linked list is that the reserve list does not have immediate access to the "head to next" pointer. To get this pointer, the switch 102 must read to a centrally arbitrated memory. The time required to execute this read makes meeting the wire speed requirement very challenging.

Another disadvantage of the linked list reserve pointer storage switch approach is that delivery of successfully switched frames may be more complex and error prone. In this regard, the control logic must consider whether the "head to next" read can be perpetual, in progress, or has been successfully completed. The three different cases must all be handled differently as is well known in the art.

The use of jumbo frames also has an impact on the use of the limited number of pointers that are in a switch. The reserve list typically holds a number of pointers that are not being used and the switches have a limited number of pointers. The reserve list further typically retains the pointers for a frame that ingressed successfully but was not forwarded to a destination output queue (dropped frames). Accordingly, these pointers cannot be used by other ports and thus impact switch operations. For example, in previous designs, the typical switch had 256 total pointers, and a frame consisted of up to 3-4 pointers. Accordingly, the reserve list held only about 1.5 percent of the switches total pointers when a frame was dropped. Switches that may support jumbo frames up to 10,240 bytes (20 pointers), still only have 256 total pointers. Now a single reserve list retains about 8 percent of the switches pointers when a frame has dropped. For example, if a particular switch has 6 ports and jumbo frames ingress all 6 ports and all of the jumbo frames are dropped and thereafter a normal frame ingresses only at one port, the result is that five ports would each hold 20 pointers in reserve. This would represent 100/256 of the pointers or 40 percent of the available buffer memory. Thus, the limited number of pointers cause problems, such as a lack of pointers, when jumbo frames are used.

Accordingly, there is a need for a network switch that includes a pointer reserve storage and/or process that overcomes the disadvantages realized when using larger size frames.

SUMMARY

The invention provides a hybrid pointer storage for switching of large frames that combines aspects of FIFO pointer storage and linked lists in a new reserve list. It also provides a pointer management process for frames, including a unique double linked list or frame usable in a hybrid pointer storage or independently.

The reserve pointer storage of the invention may handle buffering of frames including fragmentation of frames with minimal impact and may operate at higher speed. As used herein, fragmentation physically may refer to the size of the memory buffer addressed by a pointer, as well as the maximum size of a frame. In previous designs, a buffer was 512 bytes and the maximum frame size was 1518 to 2048 bytes. Thus, typically a frame consisted of a maximum of 3 to 4 pointers. However, with larger size frames, using a buffer that is still 512 bytes, the maximum frame size is 10240 bytes requiring approximately 20 pointers. Future designs may have a maximum frame size of 10240 bytes but may use 128 byte buffers, allowing a frame to require up to 80 pointers. Accordingly, the invention may be able to handle a maximum frame this size or greater with the use of 4, 20, 80 or more pointers with little impact upon speed and area.

The invention may be implemented in a number of ways. According to one aspect of the invention, a method of allocating pointers in a network switch includes steps of allocating the first predetermined number of free pointers from a free list to a first in first out memory, allocating the second predetermined number of pointers to a linked list after the first predetermined number of pointers for the first in first out memory has been allocated, receiving a frame in the network switch, forwarding at least one pointer from the first in first out memory to an ingress module to buffer the frame, and forwarding pointers from the linked list to the first in first out memory responsive to forwarding at least one pointer from the first in first out memory to an ingress module to buffer the frame.

The method may further include a step of forwarding at least one free pointer from the free list to the linked list responsive to the step of forwarding at least one pointer from the first in first out memory to an ingress module to buffer the frame. The method may further include steps of removing the pointers allocated in the linked list upon either forwarding a frame or returning pointers to the free list. The linked list may include a double-linked list, and the method may further include returning pointers in the double-linked list starting from a tail of the free list. The method may further include steps of setting a threshold number for returning pointers from the double-linked list, and stopping the returning of the pointers to the free list at a predetermined number of pointers from a head of the free list. The method may further include a step of forwarding a pointer to an egress module for transmission of the frame. The first and second predetermined number of pointers is based on at least one programmable threshold.

According to another aspect of the invention, a machine-readable medium comprising instructions, which, when executed by at least one network switch cause network switching, the instructions include instructions for allocating the first predetermined number of free pointers from a free list to a first in first out memory, instructions for allocating the second predetermined number of pointers to a linked list after the first predetermined number of pointers for the first in first out memory has been allocated, instructions for receiving a frame in the network switch, instructions for forwarding at least one pointer from the first in first out memory to the ingress module to buffer the frame, and instructions for forwarding pointers from the linked list to the first in first out memory responsive to forwarding at least one pointer from the first in first out memory to the ingress module to buffer the frame.

The machine-readable medium may further include instructions for forwarding at least one free pointer from the free list to the linked list responsive to the instructions for forwarding at least one pointer from the first in first out memory to the ingress module to buffer the frame. The machine-readable medium may further include instructions for removing the pointers allocated in the linked list in response to at least one of forwarding a frame and returning pointers to the free list. The linked list may include a double-linked list, and the machine-readable medium may further include instructions for returning pointers in the double-linked list starting from a tail of the free list. The machine-readable medium may further include instructions for setting a threshold number for returning pointers from the double-linked list, and instructions for stopping the returning of the pointers to the free list at a predetermined number of pointers from a head of the free list. The machine-readable medium may further include instructions for forwarding a pointer to an egress module for transmission of the frame. The first and second predetermined number of pointers may be based on at least one programmable threshold.

According to another aspect of the invention, a circuit to allocate pointers in a network switch includes a memory to store a frame, a reserve module to receive pointers. The reserve module includes a first in first out memory and a linked list, the first in first out memory being configured to receive the first predetermined number of free pointers from a free list and to receive pointers from the linked list. The linked list is configured to receive a second predetermined number of pointers from the linked list after the first predetermined number of pointers has been received in the first in first out memory.

The circuit may further include an ingress module to receive a frame in the network switch and to receive at least one pointer from the first in first out memory. The circuit may further include an egress module to transmit frames from the network switch, and the egress module, the reserve module and the ingress module may be configured to operate with asynchronous clock signals. The circuit may further include a queue controller configured to forward at least one free pointer from the free list to the linked list. The circuit may further include a queue controller configured to remove the pointers from the linked list upon either forwarding a frame or returning the pointers to the free list. The linked list may include a double-linked list, and the queue controller may be further configured to return pointers in the double-linked list starting from the tail of the free list.

According to another aspect of the invention, a circuit for allocating pointers in a network switch includes means for allocating the first predetermined number of free pointers from a free list to a first in first out memory, means for allocating the second predetermined number of pointers to a linked list after the first predetermined number of pointers for the first in first out memory has been allocated, means for receiving a frame in the network switch, means for forwarding at least one pointer from the first in first out memory to the ingress module to buffer the frame, and means for forwarding pointers from the linked list to the first in first out memory.

The circuit may further include means forwarding at least one free pointer from the free list to the linked list. The circuit may further include means for removing the pointers allocated in the linked list upon either forwarding a frame or returning pointers to the free list. The linked list may include a double-linked list, and the circuit may further include means for returning pointers in the double-linked list starting from a tail of the free list. The circuit may further include means for setting a threshold number for returning pointers from the double-linked list, and means for stopping the returning of the pointers to the free list at a predetermined number of pointers from a head of the free list. The circuit may further include means for forwarding a pointer to an egress module for transmission of the frame. The first and second predetermined number of pointers may be based on at least one programmable threshold.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings:

FIG. 5A shows an exemplary schematic diagram of a frame of the invention with pointers while

DETAILED DESCRIPTION

Figure 1:
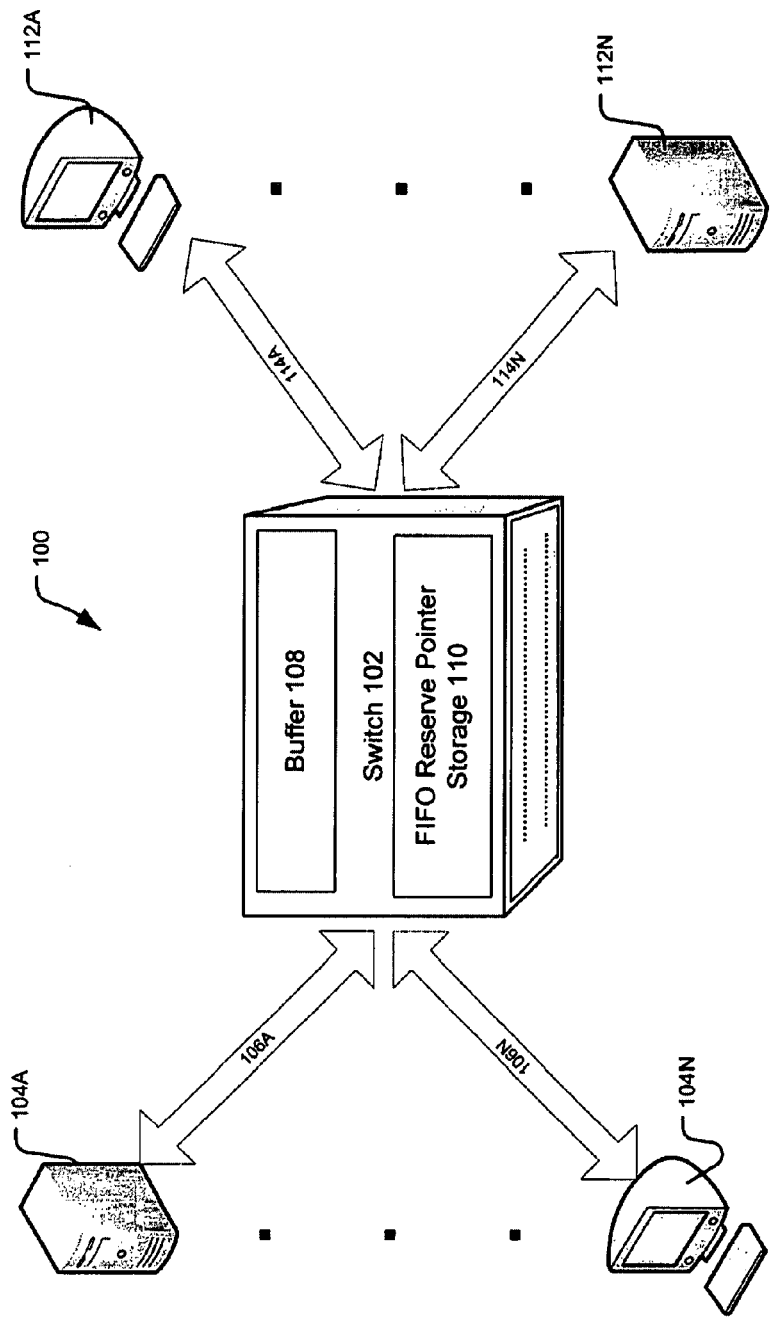
FIG. 1 shows a simple prior art network in which a network switch has a FIFO memory reserve list pointer storage to connect devices on the network.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

Figure 3:
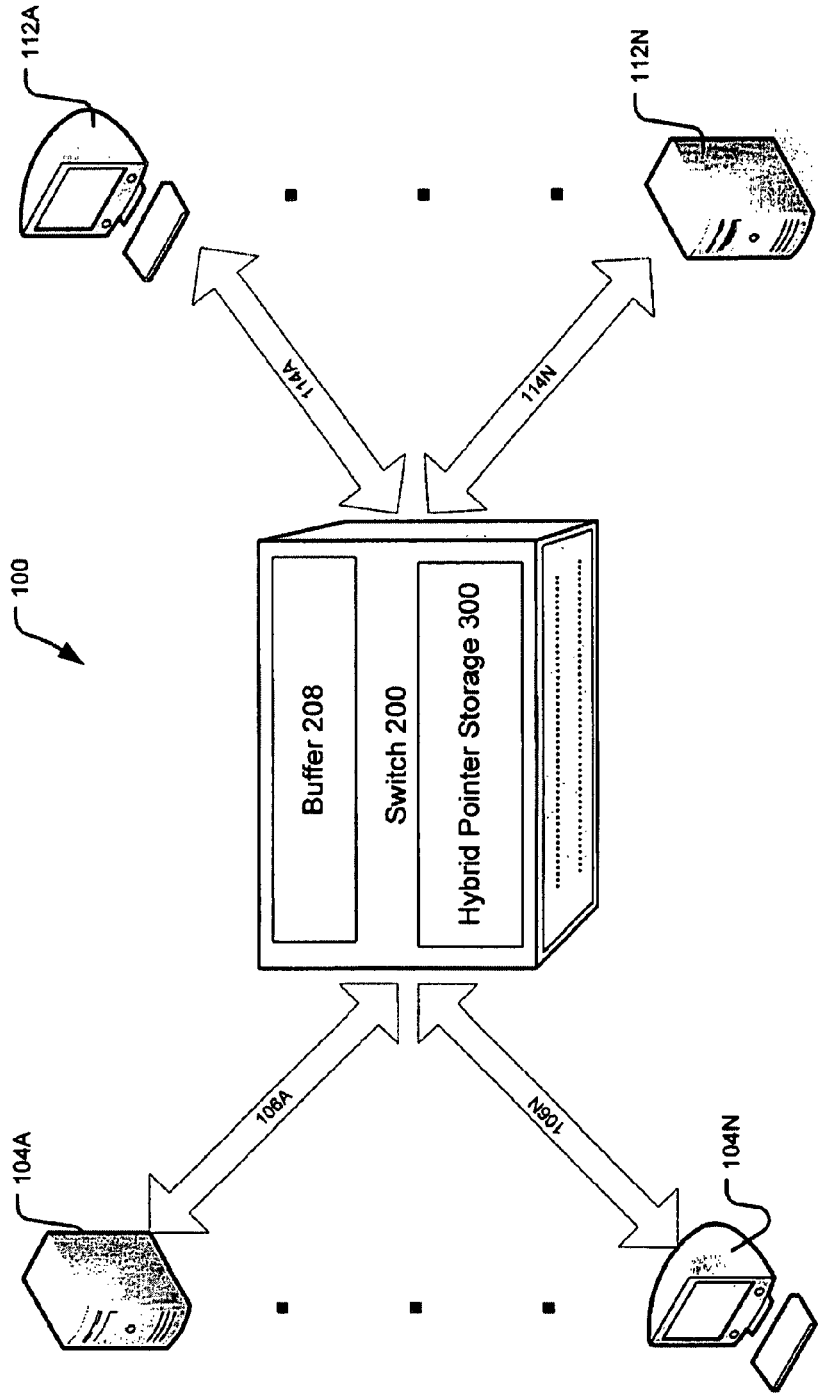
FIG. 3 is a block diagram of a network switch having a hybrid pointer storage constructed according to the principles of the invention.

FIG. 3 is a block diagram of a network switch having a hybrid pointer storage with a reserve list constructed according to the principles of the invention. More specifically, the switch 200 includes a buffer 208 to hold the data from frames received as is well known in the art. Additionally, switch 200 includes a hybrid pointer storage 300. The hybrid pointer storage 300 operates according to the process as described in further detail below with respect to FIG. 4.

Figure 4:
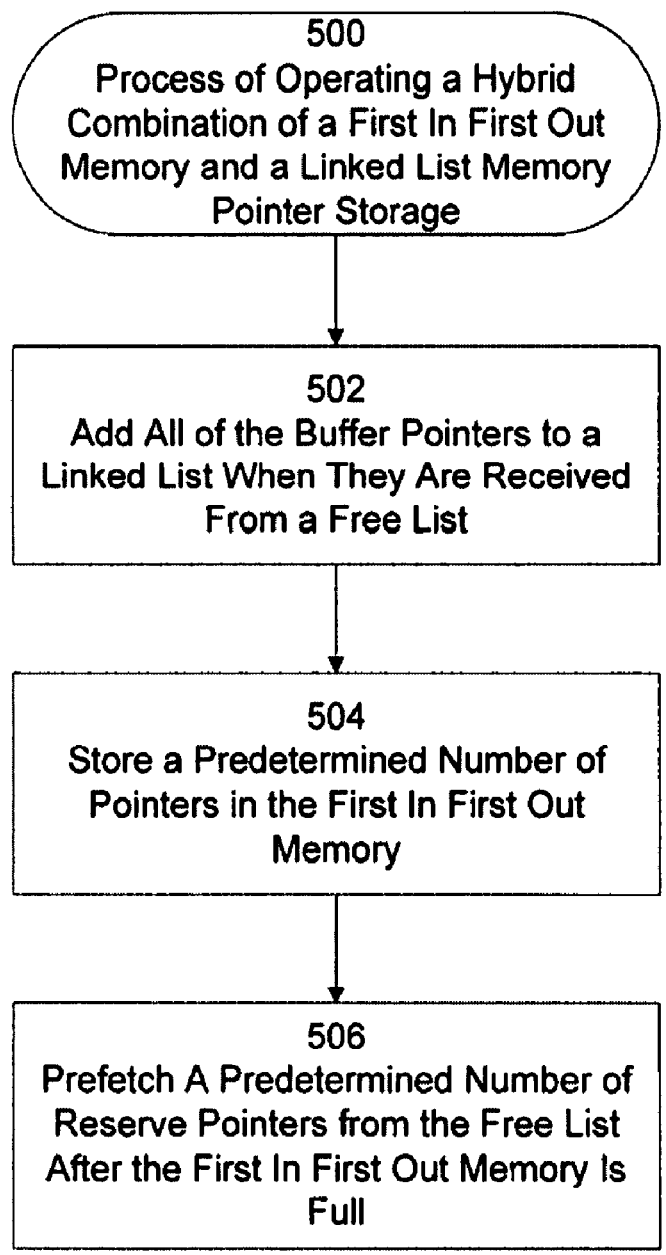
FIG. 4 is a flowchart of a process for a operating the hybrid pointer storage of the invention.

FIG. 4 is a flowchart of a process 500 of the invention for operating the network switch of FIG. 3. More specifically, FIG. 4 shows a process employing a FIFO memory and a linked list memory pointer storage process that provides unexpected improvements in pointer usage, operation and storage. As shown in step 502, all of the buffer pointers are added to a "virtual" linked list when they are received from a free list. These same pointers are then subtracted from the linked list when dequeued when forwarding a frame, being returned to the free list, and so on.

Next, in step 504, a predetermined number of pointers are stored in a F-deep FIFO memory, such as a buffer (F being a positive integer). In order to determine how many pointers may be stored in the FIFO memory, a programmable threshold is set. This threshold is referred to hereinafter as "ThreshFetchFIFO." By necessity ThreshFetchFIFO is less than or equal to F. As an example, the F-deep FIFO memory may be implemented as a 4-Deep FIFO memory, but may set the ThreshFetchFIFO at a maximum of 2 pointers for the FIFO memory. When a pointer is fetched from the free list, the pointer may always be enqueued to a tail of the linked list. In addition, if the FIFO memory size is less than the threshold ThreshFetchFIFO, the pointer is enqueued to the FIFO memory.

When an ingress module requests a pointer, the module may be provided a pointer from the FIFO memory, if the FIFO memory is not empty. A second threshold may be set, hereinafter referred to as "ThreshFetchList." ThreshFetchList specifies a number of reserve pointers that may be prefetched from the free list after a FIFO memory is full. In other words, the ThreshFetchList is the number of predetermined reserve pointers that are in the linked list but not in the FIFO memory as shown by step 506. Thus, the FIFO memory prefetched pointers may be used to simplify the control logic. Moreover the prefetched pointers may make it easier to meet wirespeed requirements, because the FIFO memory provides immediate access to the "next" pointers in the list. The second threshold of the "ThreshFetchList" may allow resources to be reserved for a port for higher-layer protocols without needing to store those resources in more expensive FIFO registers. Accordingly, the combination of the two storage types provide implemented as described herein provide numerous advantages not apparent or achievable when the storage types are implemented separately.

Figure 5A:
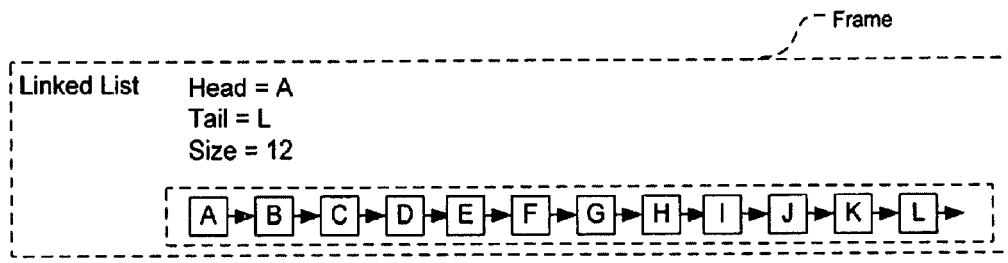
Figure 5B:
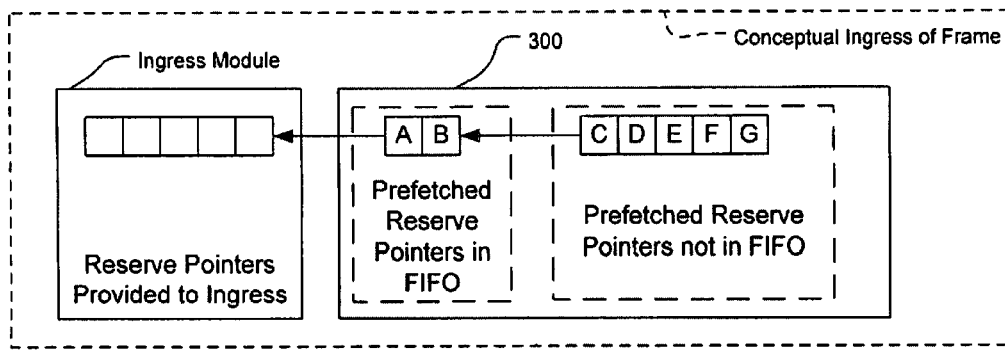
FIGS. 5B and 5C show a frame of the invention prior to and ingressing the network switch of FIG. 3, respectively.
Figure 5C:
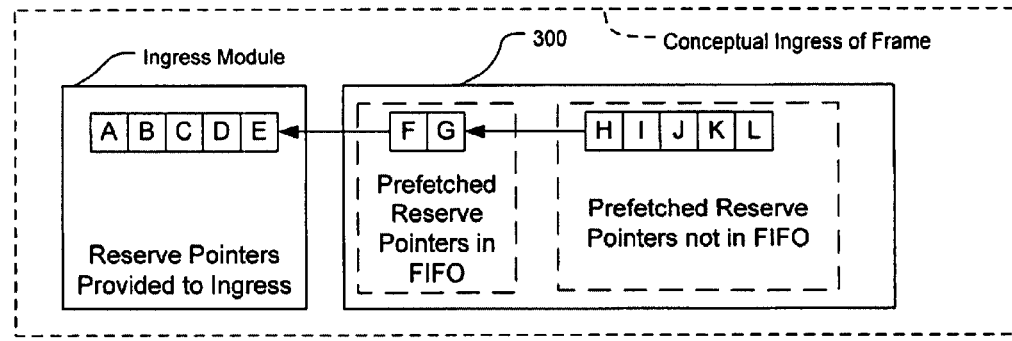

FIG. 5 shows an exemplary implementation of a frame of the invention, including pointers and FIGS. 5B and 5C show a conceptual frame linked list and being processed by the hybrid FIFO memory process 500 of FIG. 4. In the example shown in FIGS. 5B and 5C, the FIFO memory is two deep (F=2–two entry FIFO memory). Further in this example, the ThreshFetchFIFO is equal to 2 and the ThreshFetchList is equal to 5. In this example, the reserve list prefetches up to 7 pointers from the free list, of which 2 of the pointers (A, B) may be immediately accessible through the FIFO memory as shown by FIG. 5B. As shown in FIG. 5C, when a jumbo frame is ingressing and the reserve list has provided five pointers A-E to the ingress module to buffer the frame, then the linked list may indicate that the head of the frame is equal to A, that the tail is equal to L, and the size is equal to 12 as shown in the of FIG. 5A. Conceptually, as shown in FIG. 5C, the ingress module has received pointers A, B, C, D, and E. Next the queue control has loaded two reserve pointers in the FIFO memory (F and G). Finally, pointers H, I, J, K, and L may be prefetched as reserve pointers in the virtual linked list but not in the FIFO memory. Accordingly, the reserve pointers are provided to the ingress module with little impact to the wire speed and area.

Figure 6:
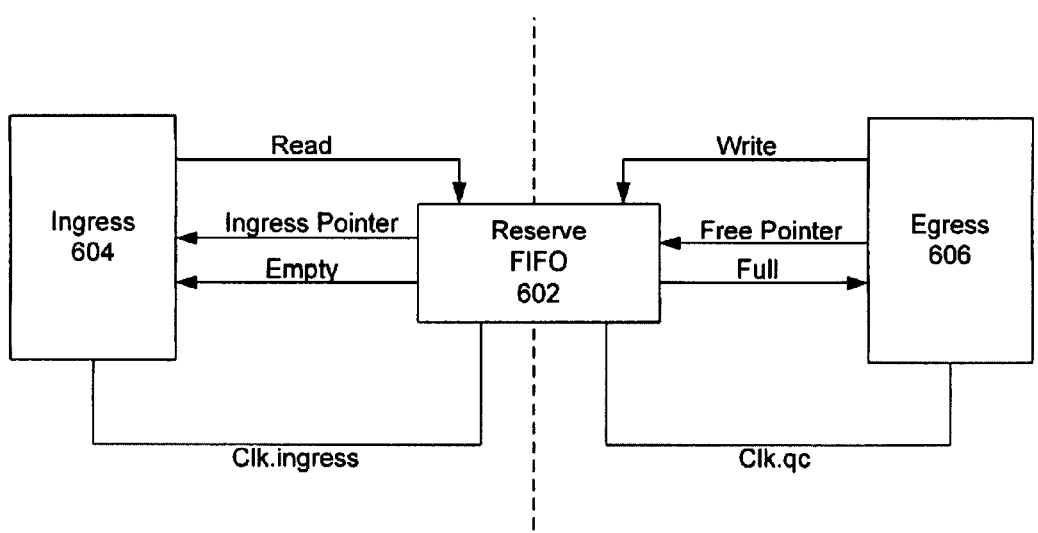
FIG. 6 is a schematic diagram of an ingress/egress module along with a queue controller constructed according to the principles of the invention for use with asynchronous clock domains.

A further advantage of this hybrid reserve list structure is that it may be useful in other architectures that may employ more than one clock. More specifically, in prior art devices the queue control and the ingress modules typically have to use the same clock domain. In the invention however, two separate modules may use asynchronous clock domains. Accordingly, as shown in FIG. 6, a FIFO memory 602 may be implemented as an asynchronous FIFO memory 602. When the ingress module 604 requires a pointer, the ingress pointer may read the pointer from an empty output of the FIFO memory with a clock domain (CLK.ingress). The queue controller (Qc) reserve logic 606 may write a pointer with a clock domain (CLK.qc) that is not the same as the CLK.ingress. This allows one to decouple the line card rate from the central processing clock rate. This is important when a port's maximum rate is much more than another port's maximum rates. For example, if a 6 port switch, with 5 ports at 1 bps and 1 port at 2 bps. If ingress and qc clock domains are the same, then qc clock must scale 2× to keep up with 2 bps ports. If decoupled, qc only has to scale by 7/6 (theoretically). This is because 7/6 is the ratio of total throughputs which results in a theoretical improvement of about 2/7/6=12/7.

Figure 2:
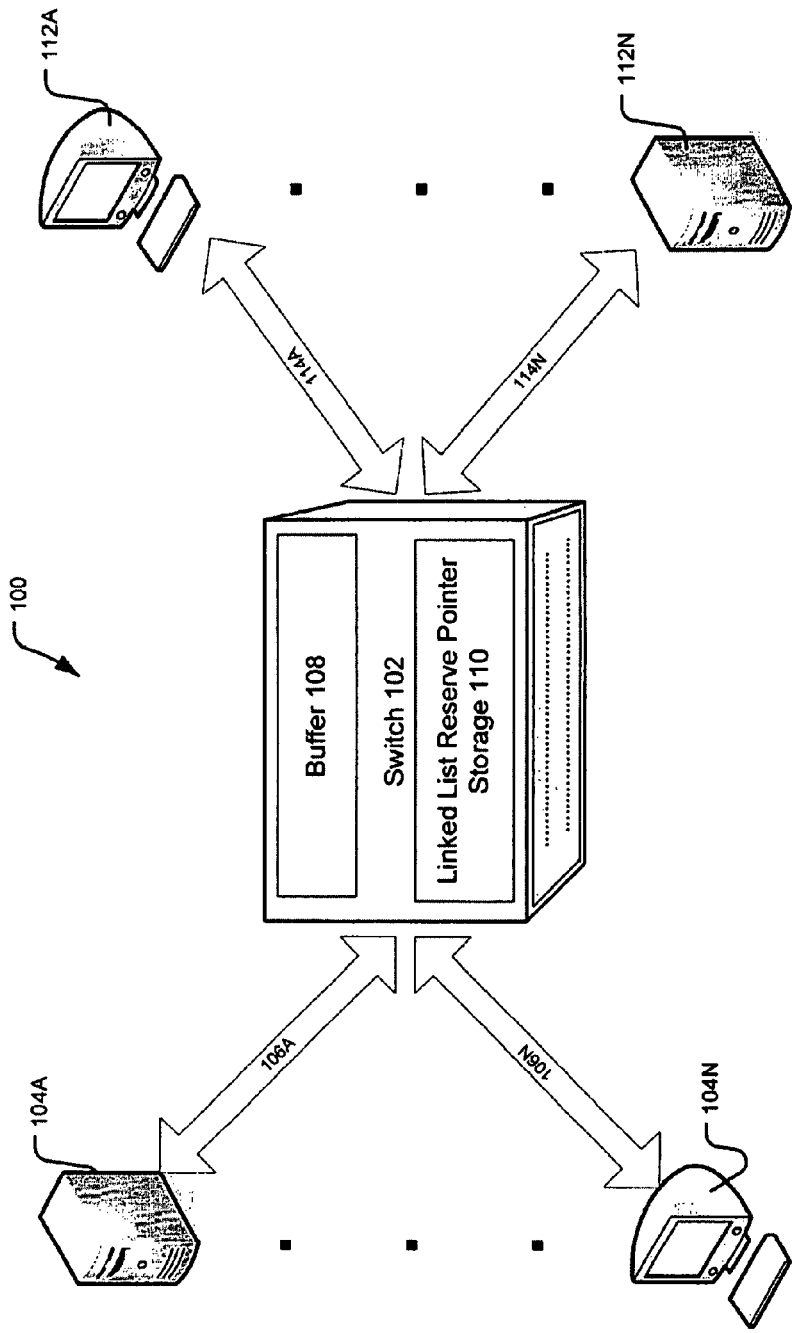
FIG. 2 shows another simple prior art network in which a network switch has a linked list reserve pointer storage to connect devices on the network.
Figure 7:
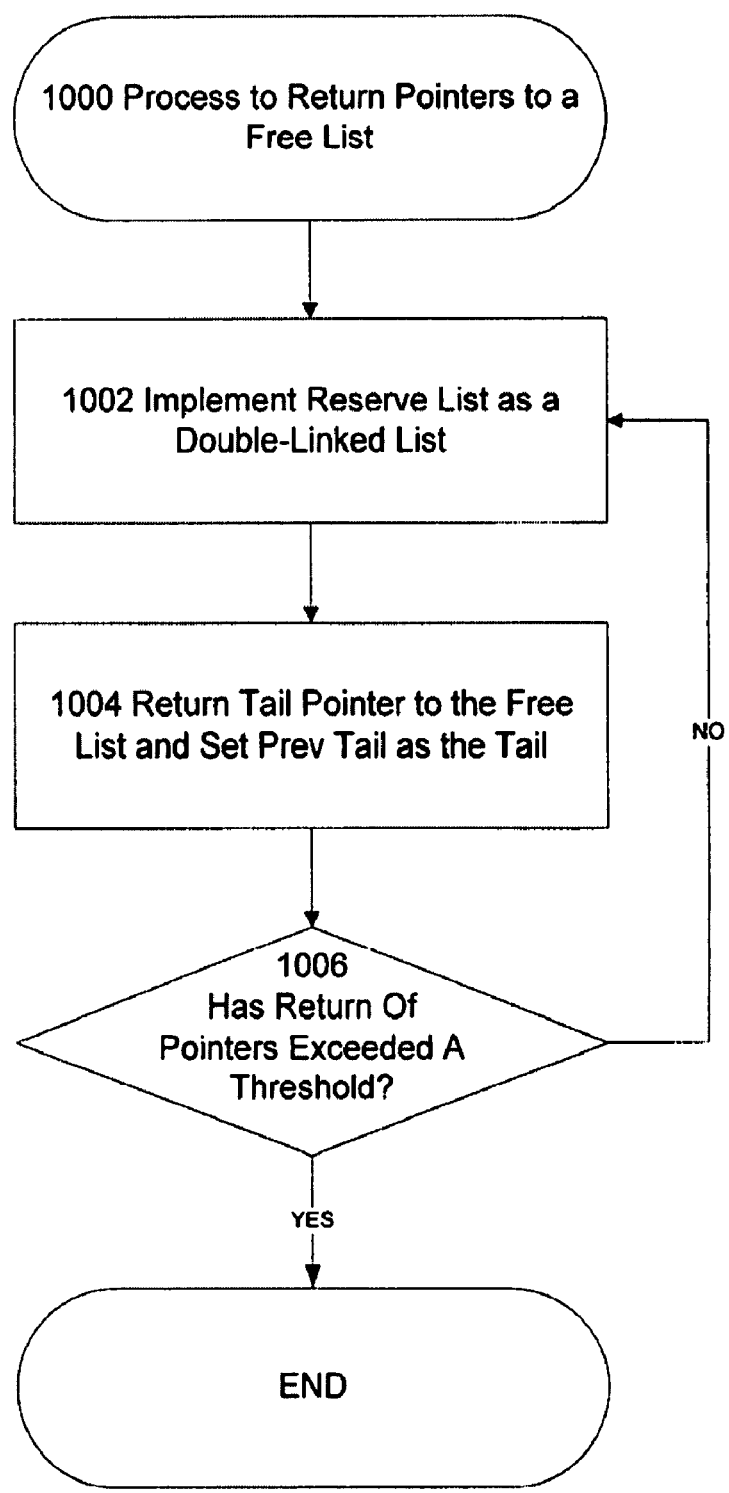
FIG. 7 shows a flow chart of a pointer management process operating according to the principles of the invention that may be performed by the network switch of FIG. 3.

FIG. 7 shows a flow chart of a pointer management process operating according to the principles of the invention that may be performed by the network switch of FIG. 3. Moreover, this management process may also be used in the prior art switches of FIGS. 1 and 2. The process of FIG. 7 addresses the problem encountered when using jumbo sized frames. In particular, as noted previously there is a need to return the pointers to a free list of pointers when frames are dropped to address a lack of pointers problem. As shown in the pointer management process 1000 in FIG. 7, the reserve list may be implemented as a double-linked list as noted by step 1002. The pointers may point to the next head of the frame. The return pointers may point to the previous tail of the frame. Accordingly, when a frame is dropped, the pointers may be returned to the free list one at a time from the tail backwards. In this regard, the tail is returned to the free list, then the "previous tail" is set as the tail, as noted at step 1004. In operation, a threshold may be set for returning the pointers as shown by step 1006. In particular, pointers may be stopped from returning at a certain distance from the head. This buffer zone may prevent from simultaneously transferring a pointer to the ingress and returning the pointer to the free list. Conceptually, the double-linked list as applied to a frame is shown in FIG. 8.

Figure 8:
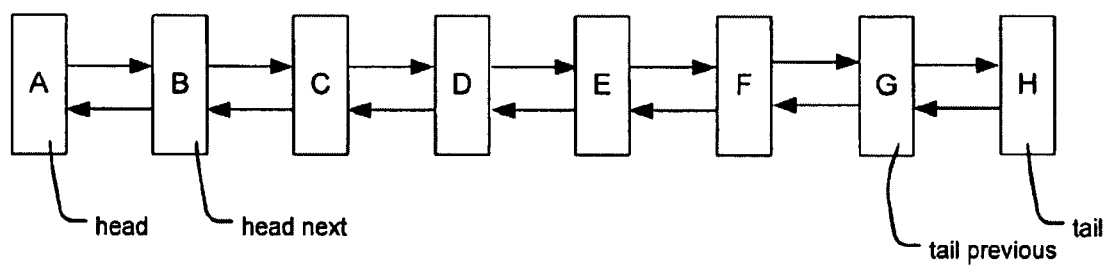
FIG. 8 is a conceptual drawing of a double-linked list as applied to a frame of the invention constructed according to the process of FIG. 7.

In particular, FIG. 8 shows the head pointer as pointer A, the B pointer as "head next" (head.next) and so on until the G pointer which is the "tail previous" (tail.previous) and the H pointer which is the tail. The right pointing arrows denote the next links, and the left pointing arrows denote the previous links. The next and previous links are generated when a pointer is enqueued from the free list.

These links may be maintained in embedded memories. In one typical implementation there may be two separate memories. One memory may hold the next links ($M_N$) and the other memory may hold the previous links ($M_P$). Another implementation may use one memory for both the next and the previous links. The first word in the memory may contain the next link, whereas the second word in memory may contain the previous link in such an implementation.

The process for returning pointers to the free list may be as follows: First, the tail previous pointer may be read and stored; second, the pointer for the tail may be returned to the free module; and finally, in the third step, the tail previous pointer may be set as the new tail. This process is initiated and/or repeated based on the following algorithm.

The following algorithm may be used according to the principles of the invention to determine when to return pointers to the free list. The first step of the algorithm is to keep track of the number of pointers for a current frame that has already transferred to an ingress module. The next step is to store in a register the number of pointers as "RSV.XFER.Size" and determine the number of reserve pointers in the FIFO memory ("RSV.FIFO.Size"). The next step is to compute the "Fetch.List.Size. This is the number of pointers fetched by the reserve list that are not in the FIFO memory and have not been transferred to the ingress module in conjunction with receiving a frame.

In the next step, the number of pointers fetched by the reserve list is computed. This value may be denoted as "Fetch.LIST.size." This value includes the number of pointers that are not in the FIFO memory and have not been transferred to the ingress module. The value of the Fetch.LIST.size may be computed with the following formula:

$$\text{Fetch.List.size} = \text{RSV.Size} - \text{RSV.FIFO.size} - \text{RSV.XFER.size}$$

Finally, a programmable threshold of returning pointers to the free list or an enabled reserve list is determined. An enabled list may have a linkup and a point state not set to disabled. When link is down, ingress is inactive. This eliminates the possibility of simultaneously transferring a pointer to ingress and returning the same pointer to free. Therefore, all pointers should be returned to free, since this is safer when the list is disabled. When the list is enabled, we usually provide save cushion to prevent this case. This arrangement may be referred to as thresh.return.enabled. The value for the threshold thresh.return.disabled has to be speculated for returning pointers when the reserve list is disabled.

Figure 9:
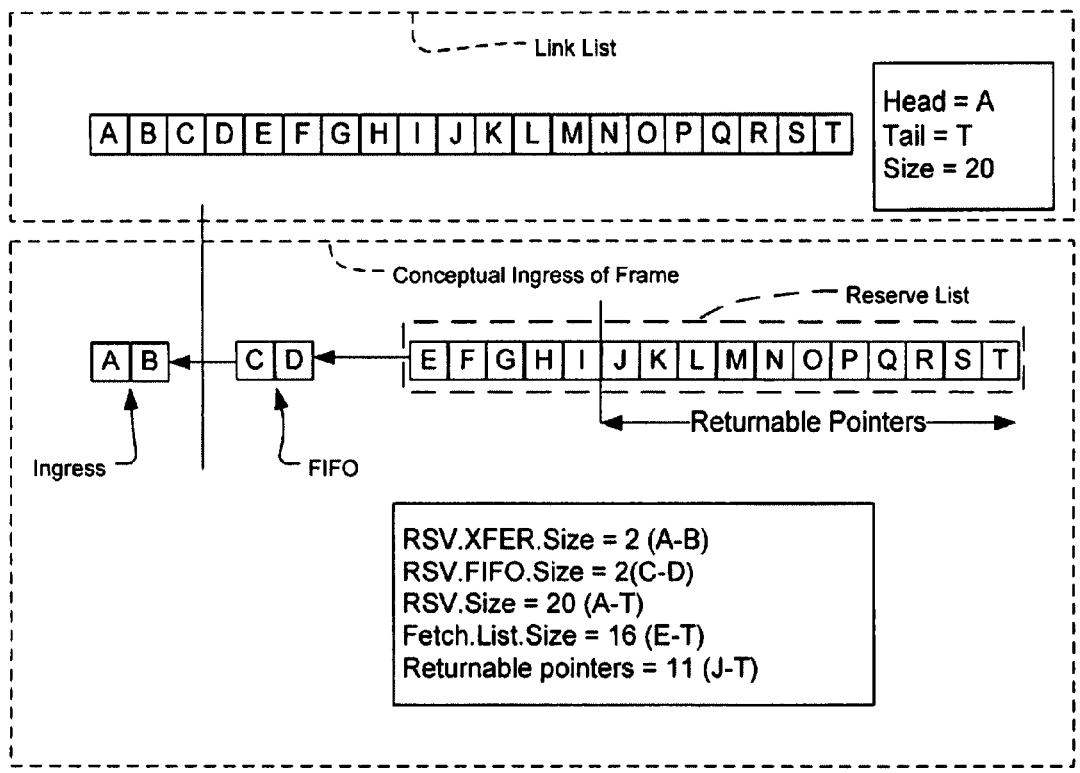
FIG. 9 is a schematic diagram of an exemplary frame of the invention using the process of FIG. 7 and shown schematically ingressing a switch.

FIG. 9 is an exemplary frame of the invention using the process of FIG. 7 shown schematically ingressing a switch. In the example of FIG. 9, the reserve list previously provided 20 pointers to a jumbo frame that was dropped. In this example, the switch has already provided the two pointers A and B to the ingress module for the current frame. As shown in FIG. 9, the linked list for the frame is shown as A through T. With such a frame, the head is equal to A, the tail is equal to T, and the size is equal to 20. As further shown in FIG. 9, the frame is shown conceptually entering the switch with pointers A and B having been transferred to ingress. Next, pointers C and D have been provided to the FIFO memory. Finally, pointers E through T have been provided to the reserve list.

In accordance with the above-noted description, RSV.XFER.Size is equal to 2 and denotes the value of A–B. The value of the RSV.FIFO.Size is equal to 2. This is computed by subtracting D from C. The RSV.Size is equal to 20 and is merely the value of A–T. The FETCH.LIST.size equals 16 is the value of E–T using the formula noted above. Accordingly, by setting Thresh.Fetch.Enabled=5, this results in eleven returnable pointers. Accordingly, these pointers in conjunction with the invention as described above in connection with FIG. 7 may be returned to the free list for use in the switch.

Although the invention contemplates eliminating the Thresh.Return.Enabled and the ThreshFetchList, it has been found that setting these values to zero may cause problems and may be dangerous to the operation of the switch. Nevertheless, any value may be used for these variables.

Figure 10:
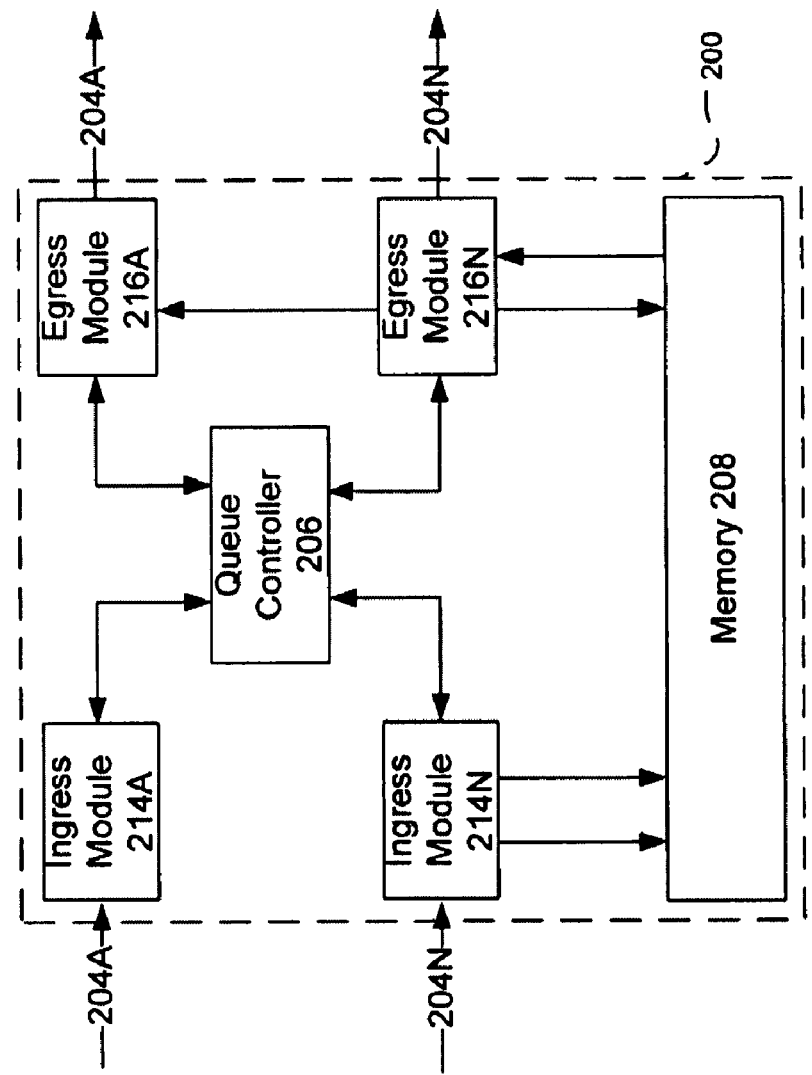
FIG. 10 is a block diagram of one embodiment of a shared-memory output-queue store-and-forward network switch with a queue controller constructed according to the principles of the invention that is useable as the network switch of FIG. 3.

FIG. 10 is a block diagram of a shared-memory output-queue store-and-forward network switch usable in network 100 of FIG. 3. Switch 200 has a plurality of ports 202A-N. Each port may be connected to a channel 204A-N, a queue controller 206 and a shared memory 208 to receive frames from the channel into the switch. This reception process is discussed in greater detail below with respect FIG. 11. Each port 202 may include an ingress module 214 A-N that may be connected to a channel 204 by a physical layer (PHY) and a media access controller (MAC). Further, referring to FIG. 10, a port 202A may include an ingress module 214A that may be connected to channel 204A by a MAC and a PHY, while an ingress module 214N may be connected to channel 204N by a MAC and a PHY to receive frames from the channel into the switch. Each port 202 may also include an egress module 216 that may be connected to a channel 204 by a MAC and a PHY to transmit frames from the switch onto the channel. This transmission process is discussed in greater detail below with respect FIG. 11. Further, referring to FIG. 10, a port 202N may include an egress module 216A that may be connected to channel 204A by a MAC and a PHY, while port 202N includes an egress module 216N that is connected to channel 204N by a MAC and a PHY to transmit frames from the switch onto the channel.

Figure 11:
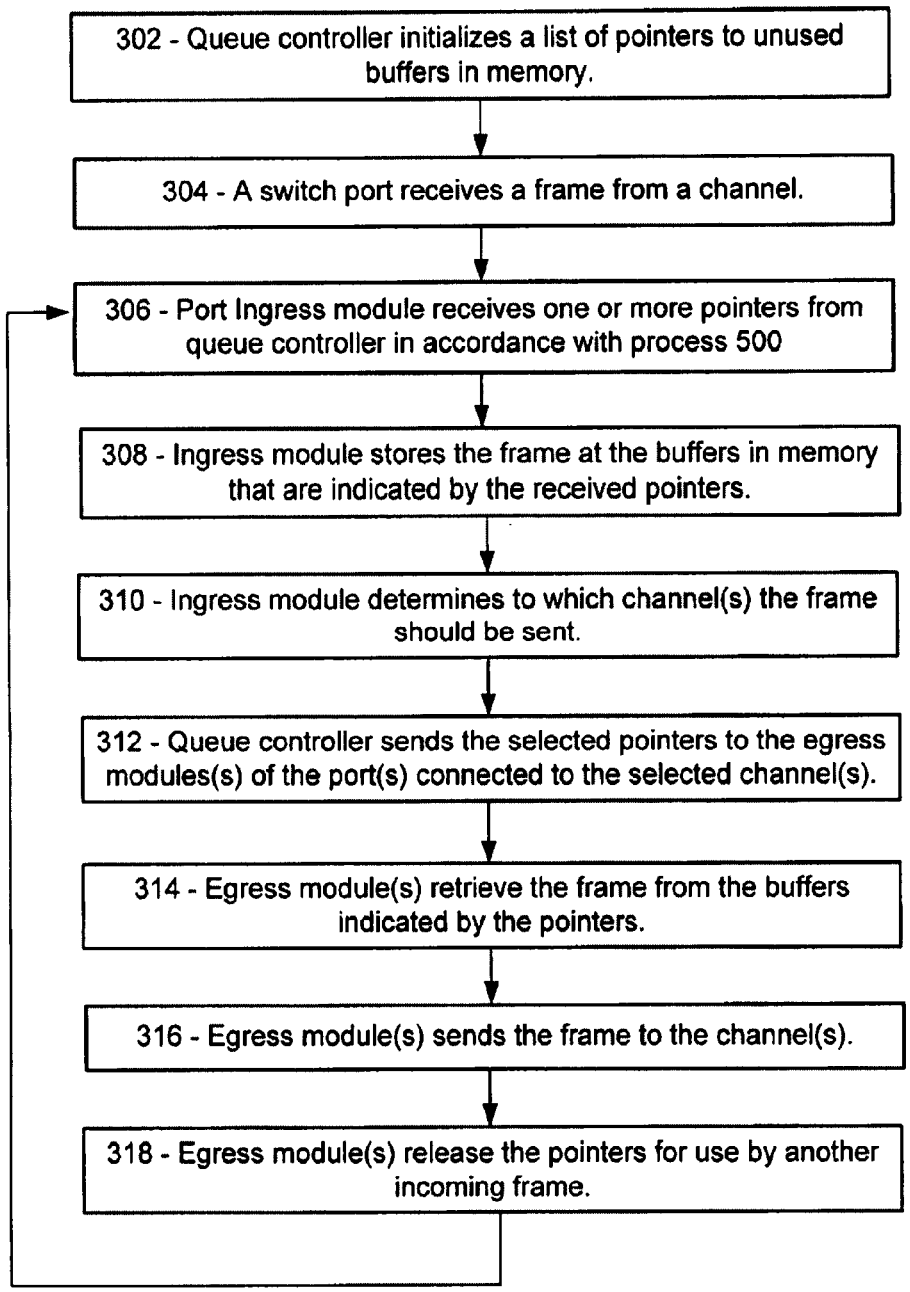
FIG. 11 is a flowchart that illustrates the network switch operating process of FIG. 4 and is further useable with the frames constructed according to the principles, as described in connection with FIG. 5.

FIG. 11 is a flowchart of an overall process 300 that includes the network switch operating process 400 of FIG. 4 and may be performed by the store and forward network switch 200 of the invention. At power-on, queue controller 206 initializes a list of pointers to unused buffers in memory 208 (step 302). A port 202 of switch 200 receives a frame from a channel 204 (step 304). The frame enters the port 202 connected to the channel 204 and traverses the PHY and MAC of the port 202 to reach the ingress module 214 of the port 202. Ingress module 214 requests and receives one or more pointers from queue controller 206 (step 306) using the process 500 of FIG. 4. Ingress module 214 stores the frame in the buffers in memory 208 indicated by the received pointers (step 308).

Ingress module 214 then determines to which channel (or channels in the case of a multicast operation) the frame should be sent, according to methods well-known in the relevant arts (step 310). Queue controller 206 sends the selected pointers to the egress modules 216 of the ports connected to the selected channels (step 312). These egress modules 216 then retrieve the frame from the buffers indicated by the pointers (step 314) and send the frame to their respective channels 204 (step 316). These egress modules 216 then release the pointers for use by another incoming frame (step 318). The operation of the switch 200 is termed "store-and-forward" because the frame is stored completely in the memory 208 before leaving the switch 200. Because all of the switch ports 202 use the same memory 208, the architecture of switch 202 is termed "shared memory."

The queue controller 206 in FIG. 10 performs the switching operation by operating only on the pointers that point to locations in the memory 208. The queue controller 206 does not operate on the frames. If pointers to frames are sent to an egress module 216 faster than that egress module 216 can transmit the frames over its channel 204, the pointers are queued within that port's output queue 216. Because pointers accumulate only at the output side of switch 200, the architecture of switch 200 is also termed "output-queued." Thus switch 200 has a store-and-forward, shared-memory, output-queued architecture.

Figure 12:
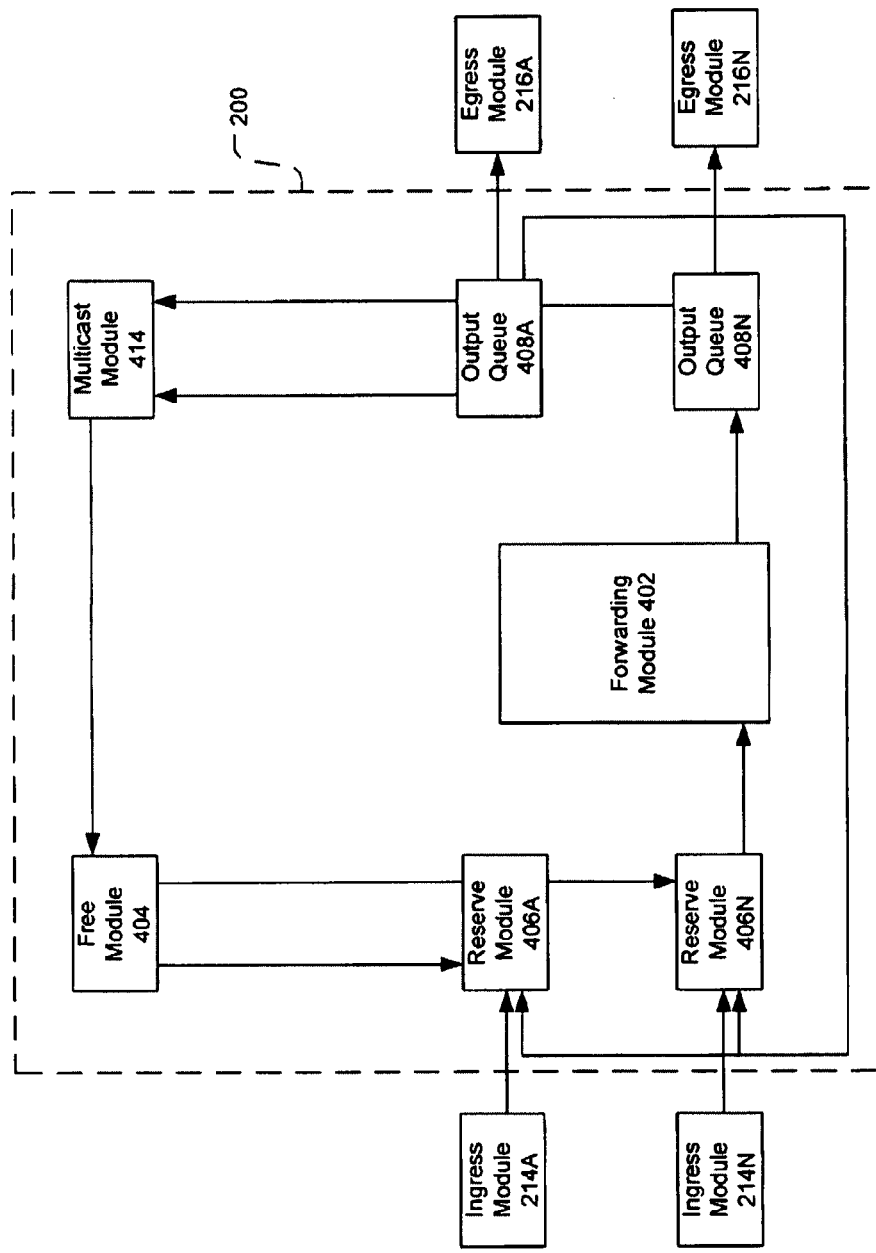
FIG. 12 is a block diagram of a queue controller that depicts the manner in which pointers to buffers circulate within the queue controller of FIG. 10.

FIG. 12 is a block diagram of a queue controller 206 suitable for use as queue controller 206 in network switch 200 of FIG. 10. The queue controller 206 may be implemented using hardware, software, or any combination thereof. The queue controller 206 may include a forwarding module 402, a free module 404, a plurality of reserve modules 406A through 406N, and a plurality of output queues 408A through 408N. Each reserve module 406 may be connected to one of the ingress modules 214. Each output queue 408 may be connected to one of the egress modules 216.

Free module 404 and reserve modules 406 each contain pointers to buffers in shared memory 208. Each output queue 408 may contain a priority queue for each class of service implemented by switch 200. Free module 404 may contain pointers to buffers in memory 208 that are available to store newly-received frames (that is, the buffers have an available status). Each reserve module 406 contains a list of pointers to available buffers that are reserved for the port housing for that reserve module. FIG. 12 further depicts the manner in which these pointers circulate within queue controller 206. Queue controller 206 allocates pointers from the free module 404 to the reserve modules 406 according to the methods described above. Buffers associated with pointers in a free module 404 have an available status until a frame is stored in the buffers. Storing a frame in one or more buffers changes the status of those buffers to unavailable. To forward a frame to an output port, the frame may be stored in a buffer in memory 208, and the pointers to that buffer may be transferred to the output queue 408 for that output port. When a frame is sent from an output port to a channel 106, the pointers for that frame may be returned to the free module 404, thereby changing the status of the pointers to available. Multicast module 414 handles multicast operations as is well known in the art.

In accordance with various embodiments of the invention, the methods described herein are intended for operation with dedicated hardware implementations including, but not limited to, semiconductors, application specific integrated circuits, programmable logic arrays, and other hardware devices constructed to implement the methods and modules described herein. Moreover, various embodiments of the invention described herein are intended for operation as software programs running on a computer processor. Furthermore, alternative software implementations including, but not limited to, distributed processing, component/object distributed processing, parallel processing, virtual machine processing, any future enhancements, or any future protocol can also be used to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed is:

1. A method of allocating pointers in a network switch, the method comprising:
    allocating a first predetermined number of free pointers from a free list to a first in first out memory;
    allocating a second predetermined number of free pointers from the free list to a linked list after the first predetermined number of pointers for the first in first out memory has been allocated;
    receiving a frame in the network switch;
    forwarding at least one pointer from the first in first out memory to an ingress module to buffer the frame; and
    forwarding pointers from the linked list to the first in first out memory responsive to the forwarding of the at least one pointer from the first in first out memory to an ingress module to buffer the frame.

2. The method according to claim 1 further comprising forwarding at least one free pointer from the free list to the linked list responsive to the forwarding at least one pointer from the first in first out memory to an ingress module to buffer the frame.

3. The method according to claim 1 further comprising removing the pointers allocated in the linked list responsive to either forwarding a frame or returning pointers to the free list.

4. The method according to claim 1 wherein the linked list comprises a double-linked list.

5. The method according to claim 4 further comprising returning pointers in the double-linked list to the free list starting from a tail.

6. The method according to claim 5 further comprising: setting a threshold number for returning pointers from the double-linked list; and stopping the returning of the pointers to the free list at a predetermined number of pointers from a head of the linked list.

7. The method according to claim 1, further comprising forwarding a pointer to an egress module for transmission of the frame.

8. The method according to claim 1 wherein the first and second predetermined number of pointers is based on at least one programmable threshold.

9. A non-transitory computer readable storage medium comprising instructions, which, when executed by at least one network switch cause network switching, the instructions comprising:
    instructions for allocating a first predetermined number of free pointers from a free list to a first in first out memory;
    instructions for allocating a second predetermined number of free pointers from the free list to a linked list after the first predetermined number of pointers for the first in first out memory has been allocated;
    instructions for receiving a frame in the network switch;
    instructions for forwarding at least one pointer from the first in first out memory to an ingress module to buffer the frame; and
    instructions for forwarding pointers from the linked list to the first in first out memory responsive to forwarding at least one pointer from the first in first out memory to the ingress module to buffer the frame.

10. The non-transitory computer readable storage medium according to claim 9 further comprising instructions for forwarding at least one free pointer from the free list to the linked list responsive to the instructions for forwarding at least one pointer from the first in first out memory to the ingress module to buffer the frame.

11. The non-transitory computer readable storage medium according to claim 9 further comprising instructions for removing the pointers allocated in the linked list in response to at least one of forwarding a frame and returning pointers to the free list.

12. The non-transitory computer readable storage medium according to claim 9 wherein the linked list comprises a double-linked list.

13. The non-transitory computer readable storage medium according to claim 12 further comprising instructions for returning pointers in the double-linked list to the free list starting from a tail.

14. The non-transitory computer readable storage machine medium according to claim 13 further comprising:
    instructions for setting a threshold number for returning pointers from the double-linked list; and
    instructions for stopping the returning of the pointers to the free list at a predetermined number of pointers from a head of the linked list.

15. The non-transitory computer readable storage medium according to claim 9, further comprising instructions for forwarding at least one pointer to an egress module for transmission of the frame.

16. The non-transitory computer readable storage medium according to claim 9 wherein the first and second predetermined number of pointers is based on at least one programmable threshold.

17. A circuit to allocate pointers in a network switch, the circuit comprising:
    a memory to store a frame;
        a reserve module to receive pointers, the reserve module comprising a first in first out memory and a linked list, wherein:
        the first in first out memory is configured to receive a first predetermined number of free pointers from a free list and to receive pointers from the linked list; and the linked list is configured to receive a second predetermined number of free pointers from the free list after the first predetermined number of pointers has been received in the first in first out memory; and an ingress module configured to receive a frame and to receive at least one pointer forwarded from the first in first out memory to buffer the frame, wherein the linked list is configured to forward pointers from the linked list to the first in first out memory responsive to the forwarding of the at least one pointer from the first in first out memory.

18. The circuit according to claim 17 further comprising:
an egress module to transmit frames from the network switch, and wherein the egress module, the reserve module, and the ingress module are configured to operate with asynchronous clock signals.

19. The circuit according to claim 17 further comprising a queue controller configured to forward at least one free pointer from the free list to the linked list.

20. The circuit according to claim 17 further comprising a queue controller configured to remove the pointers from the linked list based on forwarding a frame or returning the pointers to the free list.

21. The circuit according to claim 20 wherein the linked list comprises a double-linked list.

22. The circuit according to claim 21 wherein the queue controller is further configured to return pointers in the double-linked list starting from the tail of the free list.

23. A circuit for allocating pointers in a network switch comprising:
means for allocating a first predetermined number of free pointers from a free list to a first in first out memory;
means for allocating a second predetermined number of free pointers from the free list to a linked list after the first predetermined number of pointers for the first in first out memory has been allocated;
means for receiving a frame in the network switch;
means for forwarding at least one pointer from the first in first out memory to an ingress module to buffer the frame; and
means for forwarding pointers from the linked list to the first in first out memory responsive to the forwarding of the at least one pointer from the first in first out memory.

24. The circuit according to claim 23 further comprising means for forwarding at least one free pointer from the free list to the linked list.

25. The circuit according to claim 23 further comprising means for removing the pointers allocated in the linked list upon either forwarding a frame or returning pointers to the free list.

26. The circuit according to claim 23 wherein the linked list comprises a double-linked list.

27. The circuit according to claim 26 further comprising means for returning pointers in the double-linked list to the free list starting from a tail.

28. The circuit according to claim 27 further comprising:
means for setting a threshold number for returning pointers from the double-linked list; and
means for stopping the returning of the pointers to the free list at a predetermined number of pointers from a head of the free list.

29. The circuit according to claim 23, further comprising means for forwarding a pointer to an egress module for transmission of the frame.

30. The circuit according to claim 23 wherein the first and second predetermined number of pointers is based on at least one programmable threshold.

* * * * *